(12) United States Patent
Sura et al.

(10) Patent No.: US 7,016,187 B2
(45) Date of Patent: Mar. 21, 2006

(54) SYSTEM AND METHOD FOR AN INFORMATION HANDLING SYSTEM HOUSING LID RELEASE

(75) Inventors: Lisa Sura, Pflugerville, TX (US); Daniel S. Carr, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/824,788

(22) Filed: Apr. 15, 2004

(65) Prior Publication Data

US 2005/0231898 A1    Oct. 20, 2005

(51) Int. Cl.
*H05K 5/00*    (2006.01)
(52) U.S. Cl. .................................. 361/683; 361/679
(58) Field of Classification Search ............... 361/683, 361/679, 724–727; 312/223.1, 223.2
See application file for complete search history.

(56) References Cited

U.S. PATENT DOCUMENTS

| | | | | |
|---|---|---|---|---|
| 4,501,460 A | * | 2/1985 | Sisler | .......................... 361/730 |
| 5,732,000 A | * | 3/1998 | Chiesi et al. | ................ 361/679 |
| 5,826,922 A | * | 10/1998 | Wernig | ......................... 292/39 |
| 2003/0081399 A1 | * | 5/2003 | Davis et al. | ................. 361/818 |

* cited by examiner

*Primary Examiner*—Anatoly Vortman
*Assistant Examiner*—Corey Broussard
(74) *Attorney, Agent, or Firm*—Hamilton & Terrile, LLP; Robert W. Holland

(57) ABSTRACT

An information handling system lid releases from an associated housing with an actuator that frees the lid and then pushes the lid from a secured position to an unsecured position for ease of removal. The actuator rotationally couples through the housing to translate a user rotation of the actuator to open and then move the lid. On the interior of the housing, the actuator is a cam having a latch push and an inclined surface. The latch push moves a latch to an open position upon initial movement of the actuator and holds the latch in the open position to release a latch catch of the lid and allow movement of the lid. The inclined surface pushes against a lid removal protrusion extending from the lid and moves the lid an increasing distance as the actuator turns to complete release of the lid from the housing by sliding hooks of the lid from slots of the housing.

12 Claims, 5 Drawing Sheets

SYSTEM AND METHOD FOR AN INFORMATION HANDLING SYSTEM HOUSING LID RELEASE

BACKGROUND OF THE INVENTION

1. Field of the Invention

The present invention relates in general to the field of information handling system housings, and more particularly to a system and method for information handling system housing lid release.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system manufacturers typically seek to assemble system components for processing information in as small of a housing as practicable within defined cost constraints. Some considerations typically taken into account with the design of desktop information handling system housings are the working space needed to assemble the processing components in the housing and the post-manufacture service and modifications that the manufacturer or users may perform. To address these considerations, information handling system housing designs typically have a lid that opens to expose the interior of the housing. Housing lids generally attach at multiple points along the housing so that the lid remains securely attached to the housing to protect the internal components and prevent inadvertent opening of an operational system. Both the housing and lid are typically fabricated from relatively thin sheet metal in order reduce weight and provide some degree of electromagnetic shielding.

Some difficulties that result from the small size and minimal thickness of information handling system housings and lids include complex arrangements for securely coupling the lid to the housing and difficulty in manually grasping a lid once the lid is released from the housing. Typically lids couple to a housing at multiple points that involve multiple manipulations of release devices to unsecure the lid from the housing. For instance, in one common arrangement screws, buttons or knobs disposed on opposing sides of the housing are each released or otherwise activated in a two-handed operation and then the lid is manually disengaged and lifted from the housing. Often, internal coupling arrangements not visible to the user, such as hooks, slots and hinges, force the user to manipulate the position of the housing to obtain the leverage needed to completely release the lid. In some cases, users have difficulty discerning between intended coupling arrangements and residual friction of coupling parts, resulting in application of excessive force that damages the housing and lid. Even after the lid is fully unsecured from the housing, the thin material tends to make manual handling of the lid for removal from the secured position difficult to accomplish.

SUMMARY OF THE INVENTION

Therefore a need has arisen for a system and method which removes an information handling system lid from its associated housing with improved simplicity.

In accordance with the present invention, a system and method are provided which substantially reduce the disadvantages and problems associated with previous methods and systems for removing an information handling system lid from its associated housing. An actuator accessible from the exterior of an information handling system housing activates a latch to release the lid and then pushes the lid relative to the housing to move the lid to an unsecured position so that the lid is accessible for manual removal from the housing.

More specifically, an exterior lid removal knob rotationally couples through the information handling system housing to translate a user activation to an interior cam actuator. Upon initial rotational movement of the actuator, a latch push formed in the cam activator moves a latch to an open position to release a latch catch coupled to the lid and allow movement of the lid relative to the housing. Subsequent rotational movement of the actuator rotates an inclined surface formed in the cam actuator into contact with a lid removal protrusion to translate the actuator rotational movement into a linear force that pushes the lid relative to the housing. The inclined surface induces adequate movement of the lid relative to the housing so that hooks formed in the lid slide out from under slots formed in the housing to unsecure the lid from the housing for manual removal of the lid. Springs bias the actuator knob to the locked position and the latch to the closed position so that resecuring the lid to the housing is accomplished by sliding the hooks into the slots and engaging the latch catch in the latch to prevent the hooks from inadvertently sliding out from under the slots.

The present invention provides a number of important technical advantages. One example of an important technical advantage is that an information handling system housing securely couples with a lid in a manner that simplifies removal of the lid from the housing. The actuator disengages the lid from the housing with a one-handed operation for simplified lid removal that uses an intuitive, easy to understand rotation from a closed to an open position. The inclined surface of the cam advantageously overcomes friction in the initial disengagement and lid opening to reduce the risk of damage from the use of excessive force and moves the lid to a position more easily accessible to the grasp of a user's hand.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Removal of an information handling system lid from an associated housing is supported by a one-handed rotational operation of an actuator that releases the lid and moves the lid to an unsecure position for manual removal. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
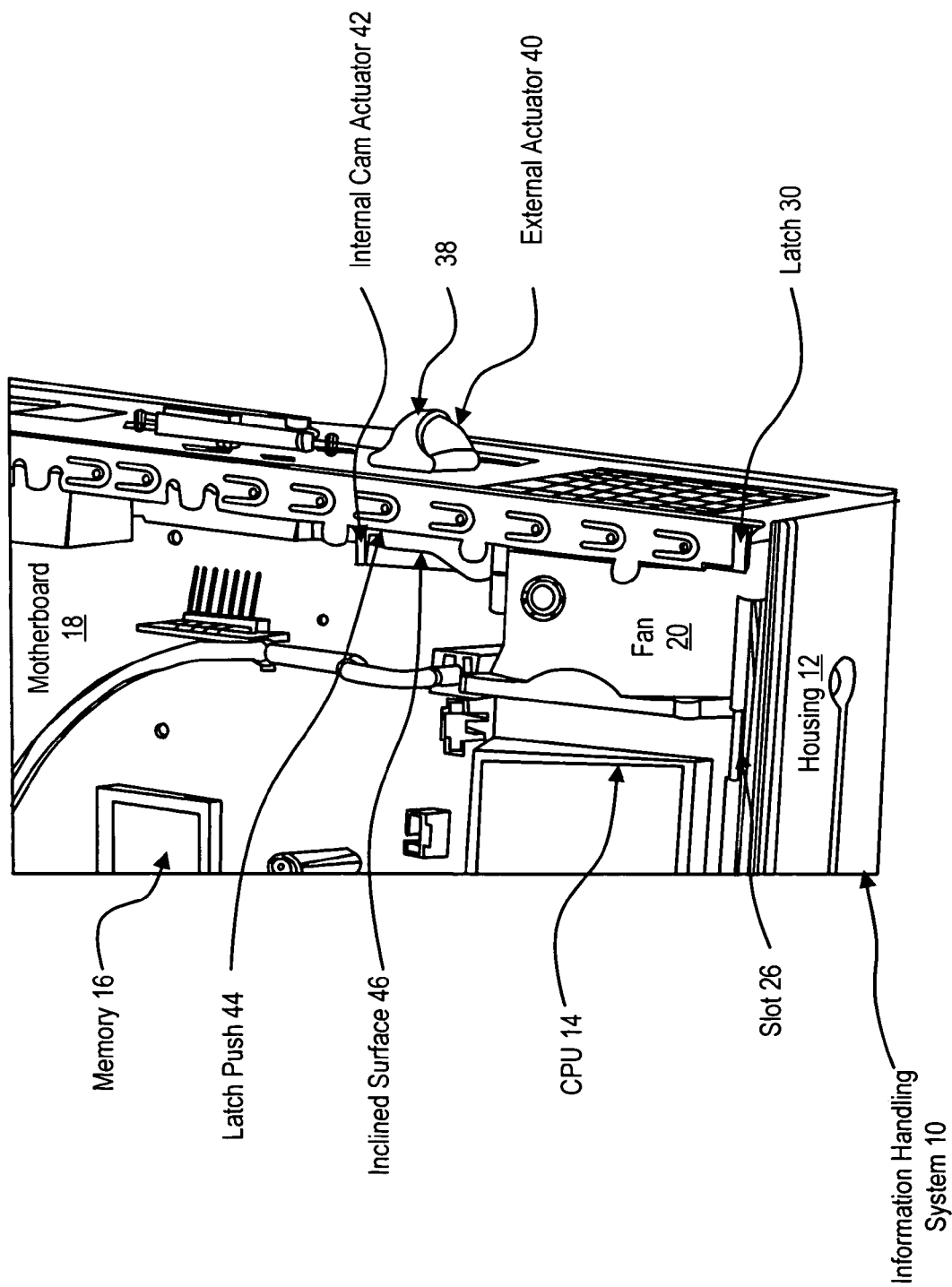
FIG. 1 depicts a top perspective view of an information handling system with its lid removed to expose the interior of its housing.
Figure 1A:
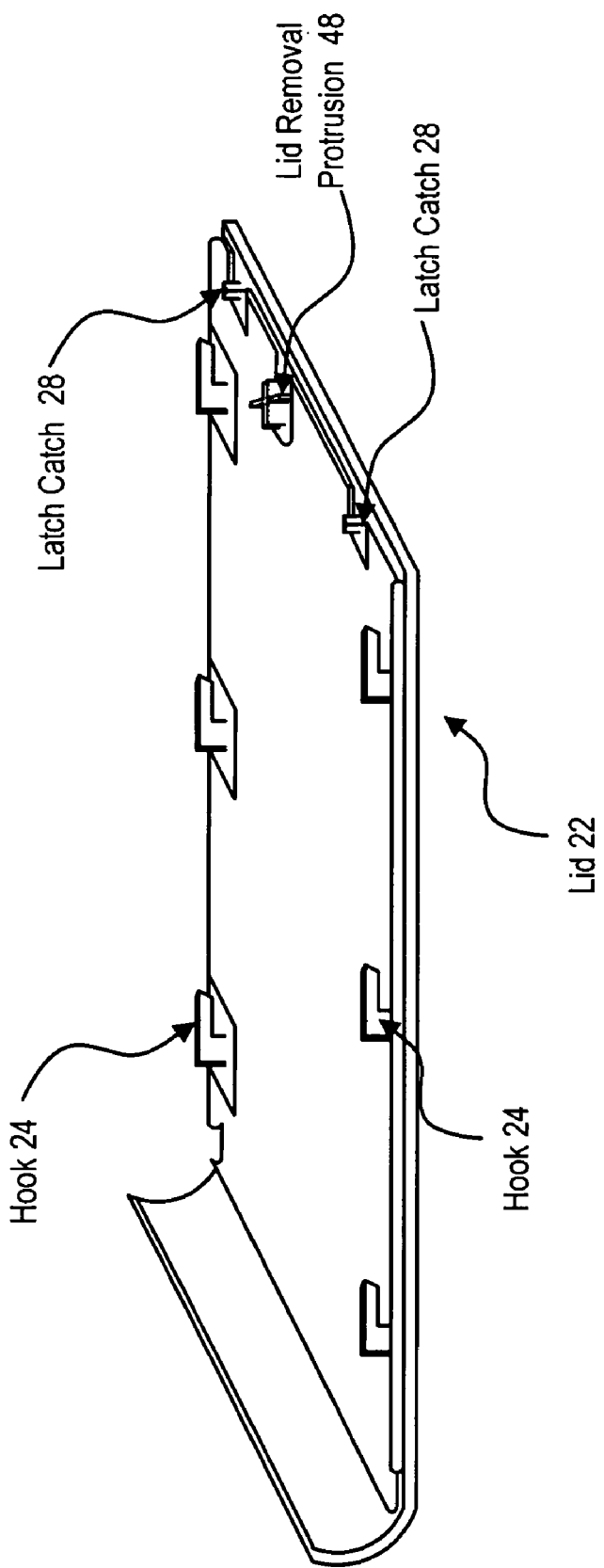
FIG. 1A depicts a top view of the interior side of an information handling system lid that fits over and covers the top opening of an associated housing.
Figure 1B:
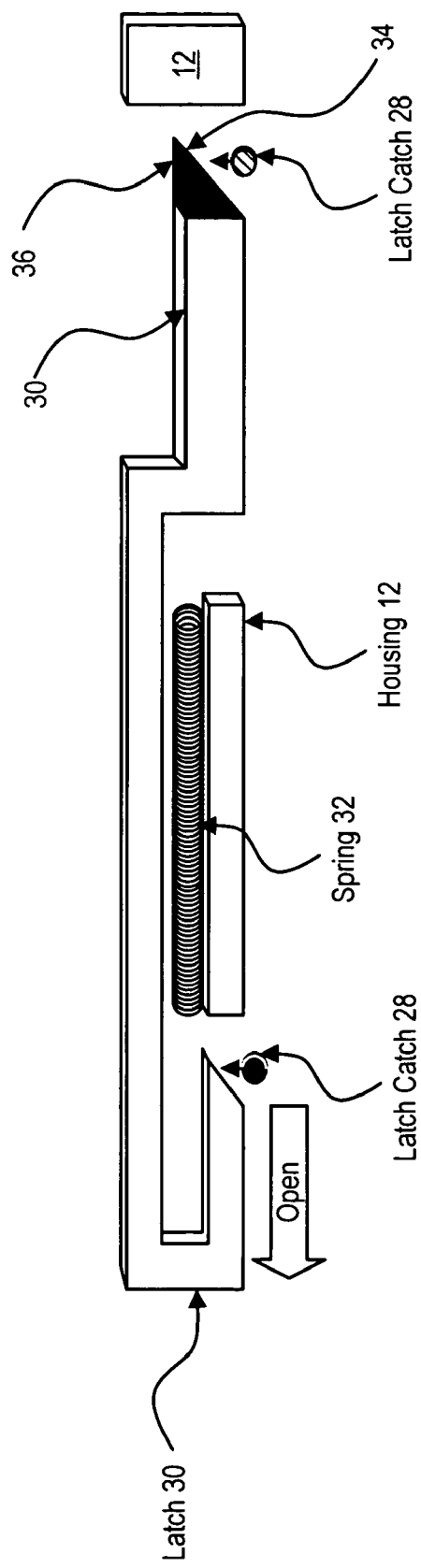
FIG. 1B depicts a top view of latch catches sliding against inclined edges of a latch.

Referring now to FIG. 1, a top perspective view depicts an information handling system 10 with its lid removed to expose the interior of its housing 12. Housing 12 retains and protects in its interior the components of information handling system 10 that are needed for processing of information, such as a CPU 14 and memory 16 that are coupled to a motherboard 18, and a fan 20 that is for introducing cooling airflow to the interior of housing 12. FIG. 1A depicts a top view of the interior side of a lid 22 that fits over and covers the top opening of housing 12. Lid 22 has opposing hooks 24 that align with and fit into slots 26 formed in housing 12 so that sliding lid 22 relative to housing 12 engages hooks 24 into slots 26 and secures lid 22 to housing 12. Lid 22 is locked into a secure position by opposing latch catches 28 that engage in a latch 30 to prevent hooks 24 from sliding out of slots 26. FIG. 1B depicts latch catches 28 sliding against inclined edges 34 of latch 30 to overcome a bias provided by a spring 32 that otherwise holds latch 30 in a closed position. Once latch catches 28 push open and past latch 30, spring 32 returns latch 30 to the closed position so that a perpendicular blocking surface 36 prevents latch catch 28 from sliding out of latch 30. When latch 30 engages latch catch 28, it prevents lid 22 from sliding relative to housing 12 and thus secures lid 22 to housing 12 with the engagement of hooks 24 in slots 26.

Referring again to FIG. 1, release of lid 22 from housing 12 is accomplished with an actuator 38 that translates a user selection to unlock lid 22 into both a release of latch 30 and a pushing of lid 22 from its secured position to release hooks 24 from slots 26. An external actuator 40 on the exterior of housing 12 rotates from a closed position approximately 90 degrees to an open position. The rotation of external actuator 40 translates to an internal cam actuator 42 that releases latch 30 with a latch push 44 and pushes lid 22 with an inclined surface 46. Latch push 44 presses latch 30 to the open position upon initial rotational movement of cam actuator 42 and maintains latch 30 in the open position through subsequent rotation of cam actuator 42 so that latch catches 28 are free to pass past blocking surface 36. Inclined surface 46 pushes against a lid removal protrusion 48 extending from lid 22 into the interior of housing 12 as depicted by FIG. 1A. As cam actuator 42 rotates, inclined surface 46 increases the distance that lid 22 is pushed in proportion with the distance of the incline so that latch catch 28 is removed from latch 30 and hooks 24 are pushed out from under slots 26. Lid 22 is then easily accessible for physical lifting and removal from housing 12 by a user.

Figure 2:
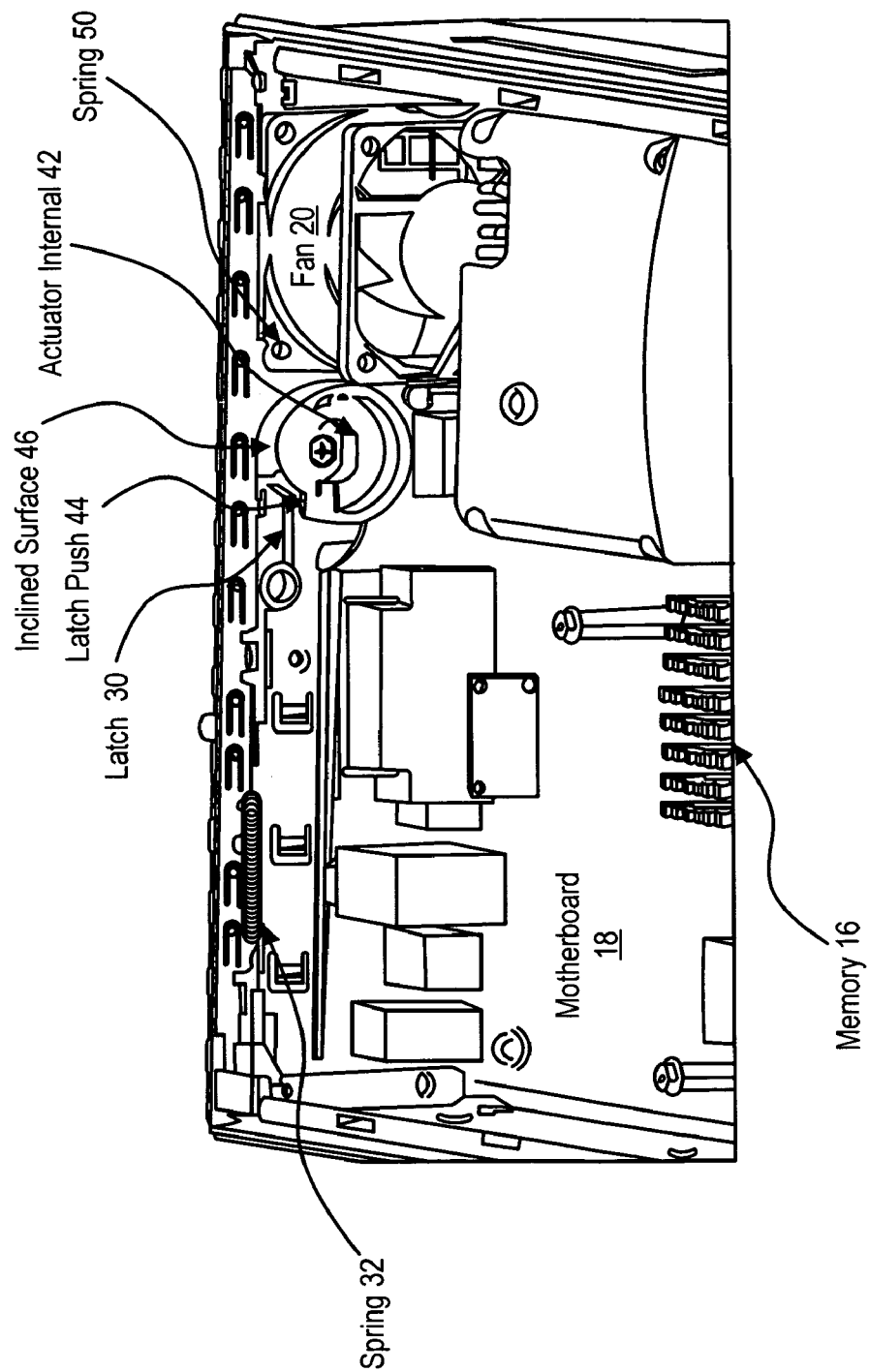
FIG. 2 depicts a top rear perspective view of a latch in the closed position with a spring biasing the latch against the actuator latch push.
Figure 3:
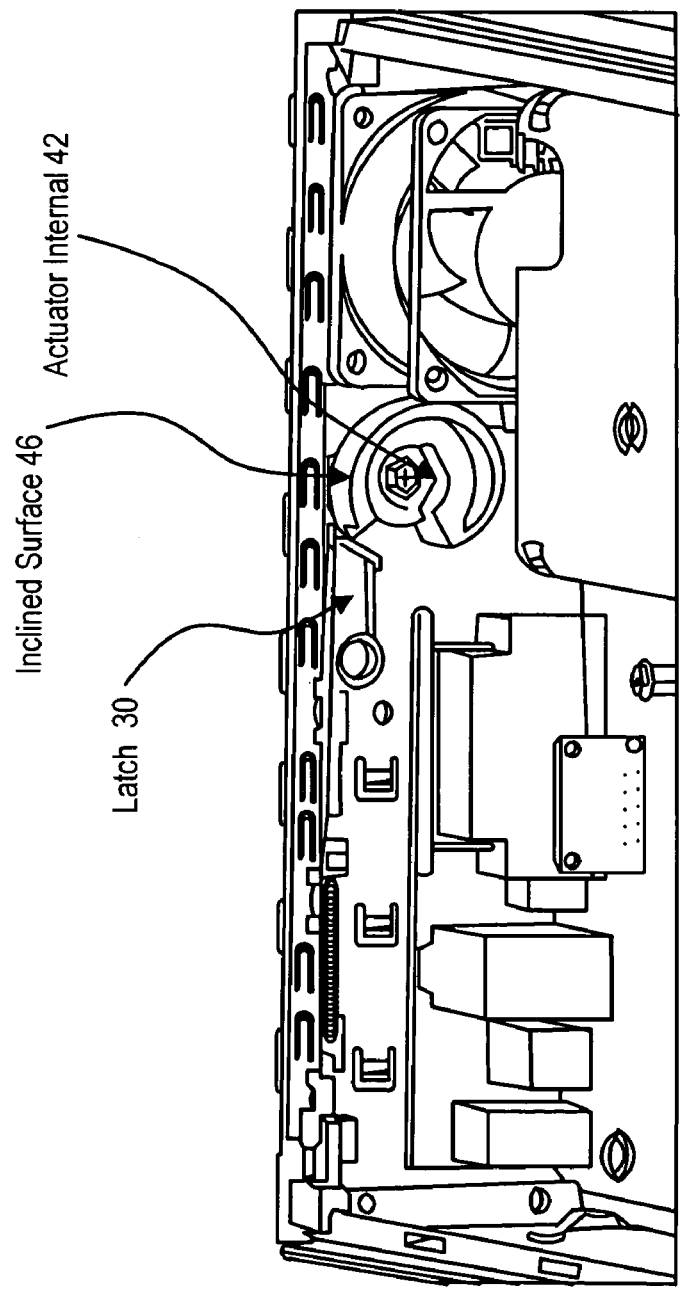
FIG. 3 depicts a top rear perspective view of initial actuator movement that moves the latch to the open position and brings the inclined surface into contact with the lid removal protrusion.

Referring now to FIG. 2, a top rear perspective view depicts latch 30 in the closed position with spring 32 biasing latch 30 against latch push 44. Cam actuator 42 is cylinder-shaped and forms latch push 44 as a missing portion of the cylinder. A spring 50 biases cam actuator 42 in the locked position. As depicted by FIG. 3, initial motion of cam actuator 42 causes immediate movement of latch 30 to the open position as latch push 44 pushes latch 30 over the outer surface of cam actuator 42. Subsequent rotation of cam actuator 42 maintains latch 30 in substantially the same position established by the circumference of the outer surface of the cylinder-shaped cam actuator 42 so that latch catch 28 remains free of the blocking surface 36 of latch 30. However, subsequent rotation of cam actuator 42 moves inclined surface 46 to the upper portion of housing 12 to engage lid removal protrusion 48 extending down from lid 22. With latch catch 28 released from the opened latch 30, engagement of inclined surface 46 against protrusion 48 releases lid 22 for movement relative to housing 12. As the degree of rotation of cam actuator 42 increases, the distance that inclined surface 46 extends into the upper portion of housing 12 increases to push lid 22 an increasing distance by engagement with lid removal protrusion 48. Upon completion of rotation of cam actuator 42, inclined surface 46 pushes lid 22 to an unsecured position in which latch catch 28 is free from latch 30 and hooks 24 are free from slots 26 so that lid 22 is easily removed from housing 12. Reattachment of lid 22 is accomplished by re-inserting hooks 24 into slots 26 and sliding lid 22 relative to housing 12 until latch catch 28 is engaged by latch 30.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having an interior, an exterior, an opening and one or more coupling points;
   plural processing components disposed in the housing and operable to process information;

a lid sized to cover the opening, the lid having a latch catch, couplings aligned to engage the coupling points, and a lid removal protrusion extending into the housing;

a latch coupled to the housing and aligned to engage the latch catch to secure the lid to the housing; and an actuator coupled to the housing and accessible to the housing exterior, the actuator aligned to disengage the latch catch from the latch and to provide a lid removing force to the lid removal protrusion, the lid removing force sliding the lid relative to the housing to release the couplings from the coupling points.

2. The information handling system of claim 1 wherein the actuator comprises a cam rotationally coupled to the housing, the cam having a latch push operable to push the latch to a disengaged position upon initiation of rotation and an inclined surface operable to push the lid from the housing.

3. The information handling system of claim 2 wherein the lid couplings comprise hooks and the housing coupling points comprise slots, the hooks operable to engage the slots by sliding the lid relative to the housing, the latch securing the lid to the housing by engaging the latch catch to prevent sliding of the lid relative to the housing.

4. The information handling system of claim 3 wherein the cam surface inclines so that rotation of the cam slides the lid relative to the housing to release the hooks from engagement with the slots.

5. The information handling system of claim 4 wherein the hooks release from the slots wit approximately ninety degrees rotation of the cam.

6. A system for removing an information handling system lid from a secured position on an information handling system housing to an unsecured position, the system comprising:

a latch operable to couple to the housing and movable between a closed position that engages a latch catch of the lid to secure the lid to the housing and an open position that disengages the latch catch of the lid to release the lid to move relative to the housing; and an actuator operable to move from a lid-secured position to a lid-unsecured position, the actuator having first and second surfaces, the first surface aligned to move the latch from the closed position to the open position upon initial movement of the actuator from the lid-secured to the lid unsecured position, the second surface aligned to push the lid from the secured position upon subsequent movement of the actuator to the lid-unsecured position;

wherein the second surface pushes the lid a predetermined distance to disengage couplings that secure the lid to the housing, the couplings separate from the latch.

7. The system of claim 6 wherein the latch comprises a blocking surface operable to selectively block sliding movement of a post extending from the lid.

8. The system of claim 7 wherein the blocking surface has an opposing surface having an incline operable to translate a sliding force applied by the post to move the latch to an open position to insert the post in the latch.

9. The system of claim 6 wherein:

the actuator is further operable to rotationally couple to the housing and rotate from a closed position to an open position;

the first surface comprises a latch push disposed to push the latch to an open position upon initiation of rotation and hold the latch in the open position as rotation continues; and the second surface comprises a cam disposed to engage the lid after initiation of rotation, the cam pushing the lid an increasing distance as the rotation continues.

10. The system of claim 9 further comprising:

a post extending from the lid aligned to engage the cam;

wherein the couplings comprise:

hooks extending from the lid; and coupling points formed in the housing, the coupling points aligned to accept the hooks in a sliding engagement.

11. The system of claim 9 further comprising one or more springs disposed to bias the actuator to a lid-secured position.

12. The system of claim 11 further comprising one or more springs disposed to bias the latch to a closed position.

* * * * *